United States Patent
Miyashita

(10) Patent No.: US 9,915,855 B1
(45) Date of Patent: Mar. 13, 2018

(54) SPRING LOADED MOUNT ADAPTER

(71) Applicant: GoPro, Inc., San Mateo, CA (US)

(72) Inventor: Yusuke Miyashita, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/336,703

(22) Filed: Oct. 27, 2016

(51) Int. Cl.
*G03B 17/00* (2006.01)
*G03B 17/56* (2006.01)
*F16M 11/04* (2006.01)
*F16M 11/10* (2006.01)

(52) U.S. Cl.
CPC ......... *G03B 17/561* (2013.01); *F16M 11/041* (2013.01); *F16M 11/10* (2013.01); *F16M 2200/022* (2013.01)

(58) Field of Classification Search
CPC ..... G03B 17/561; F16M 11/041; F16M 11/10
USPC ............................ 396/419–428; 348/373–376
See application file for complete search history.

(56) References Cited

U.S. PATENT DOCUMENTS

| | | | |
|---|---|---|---|
| 9,229,299 B1* | 1/2016 | Morlon | G03B 17/561 |
| 2009/0173863 A1* | 7/2009 | Crown | B60R 11/0241 |
| | | | 248/316.4 |
| 2011/0138673 A1* | 6/2011 | Deros | F41G 11/003 |
| | | | 42/90 |
| 2015/0305518 A1* | 10/2015 | Galant | F16M 11/041 |
| | | | 248/551 |
| 2016/0131963 A1* | 5/2016 | Clearman | G03B 17/561 |
| | | | 224/267 |
| 2016/0216597 A1* | 7/2016 | Lim | G03B 17/566 |
| 2017/0090273 A1* | 3/2017 | Clearman | G03B 17/561 |

\* cited by examiner

*Primary Examiner* — Rodney Fuller
(74) *Attorney, Agent, or Firm* — Fenwick & West LLP

(57) ABSTRACT

The spring loaded mount adapter couples with a camera system to affix the position of the camera system. The spring loaded mount adapter includes multiple raised members that, at a resting configuration, are designed to couple with extensions of the camera frame and prevent the camera system from displacing. A user may decouple the camera system from the spring loaded mount adapter by providing a user input to multiple input mechanisms of the spring loaded mount adapter. In doing so, the applied force movably displaces the multiple raised members, thereby eliminating their coupling with the camera system. The camera system may be conveniently removed in response to the user provided input.

20 Claims, 4 Drawing Sheets

SPRING LOADED MOUNT ADAPTER

TECHNICAL FIELD

This disclosure relates to camera mount adapters, more specifically, a spring loaded camera mount adapter.

BACKGROUND

Digital cameras are often used to capture pictures or videos in a variety of settings such as in outdoor and sports environments. Camera mount adapters are often coupled to a camera system to stabilize the camera system. However, once a camera system is coupled to a mount adapter, it may be difficult to change the orientation of the camera. Therefore, it may be desirable rapidly decouple the camera system from the camera mount adapter. Current mount adapters are cumbersome and require significant manual input from a user in order to release the camera system from the mount adapter. Accordingly, what is needed is a mount adapter that can effectively stabilize the camera system when coupled, but also enables the rapid release of the camera system in the event that the user would like to gain access to only the camera system.

BRIEF DESCRIPTIONS OF THE DRAWINGS

The disclosed embodiments have other advantages and features which will be more readily apparent from the following detailed description and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a spring loaded mount adapter that may be configured to stabilize a mounted camera. By way of example, at least a portion of the spring loaded mount adapter couples with an object such as a camera frame that is structured to at least partially enclose a camera. The camera and camera frame are hereafter referred to together as a camera system. The spring loaded mount adapter may be further configured to receive a user provided force input that releases the camera system from the portion of the spring loaded mount adapter. Thus, a user can rapidly couple and decouple the camera system from the spring loaded mount adapter.

The spring loaded mount adapter may include multiple components that may couple with the camera frame to fix a position of the camera. Once the position of the camera system is fixed, the camera of the camera system may capture steady, high quality images. For example, the spring loaded mount adapter may have a first component, a second component, and a base component. The components may each have a raised member that interlocks with the camera frame, thereby stabilizing the camera system. In addition, the first component and/or the second component may each have an input mechanism that is designed to receive a force input from a user. If a user wishes to decouple the camera system from the spring loaded mount adapter, the user may provide a force input to the input mechanisms of the first and second components. The input force displaces the raised members of the first component and second component and eliminates the interlocking between the raised members of the spring loaded mount adapter and the extensions of the camera frame. Therefore, a user can easily decide to mount or dismount a camera system from a spring loaded mount adapter at his/her discretion.

Example Camera System Coupled to a Spring Loaded Mount Adapter

Figure 1:
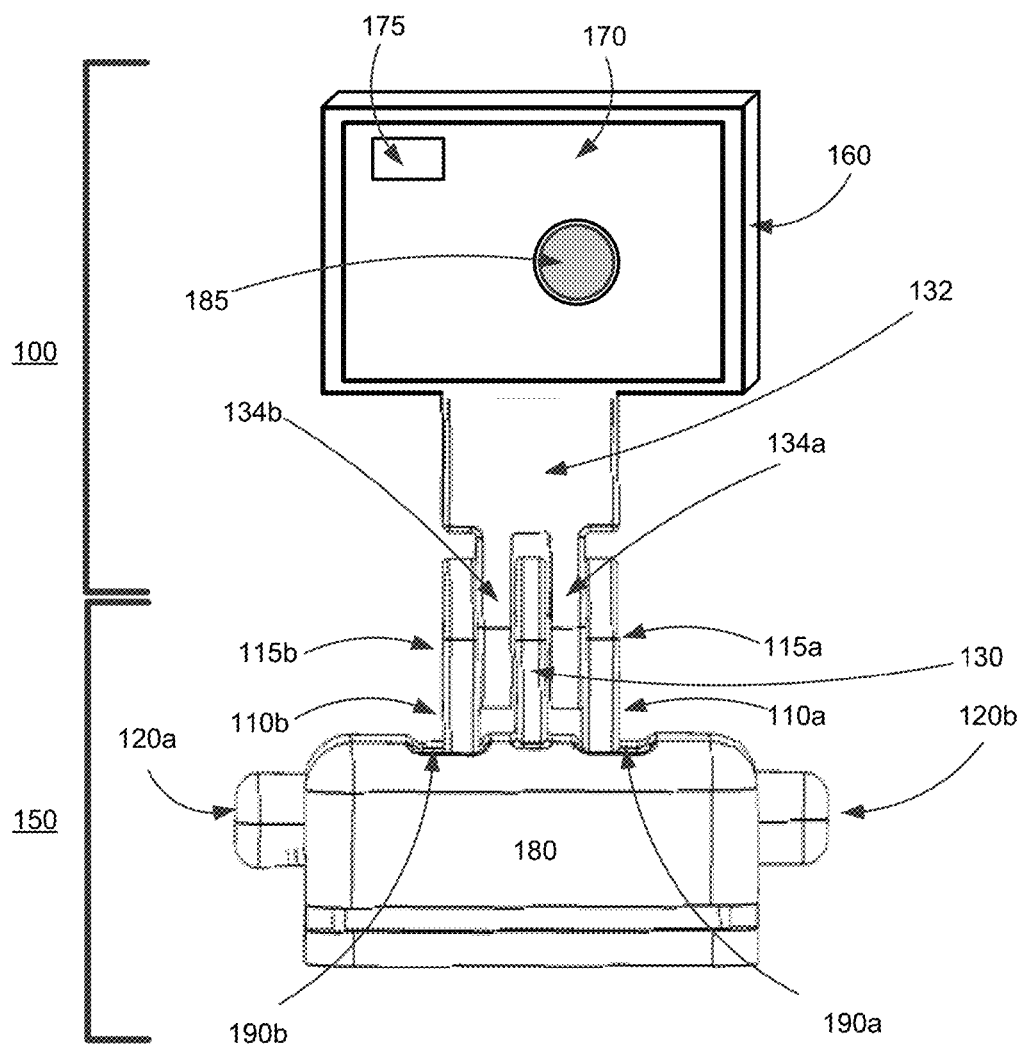
FIG. 1 illustrates a camera system secured with a spring loaded mount adapter in a resting configuration, according to one example embodiment.

Figure (FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110b" in the figures).

Referring now to FIG. 1, it shows a spring loaded mount adapter 150 coupled with a camera system 100 at a resting configuration, in accordance with an example embodiment. In this configuration, the spring loaded mount adapter 150 prevents the camera system 100 from vertically or horizontally displacing.

The camera system 100 may include a camera frame 160, a camera 170, a securing structure 132 of the camera frame 160, and multiple extensions 134a and 134b of the securing structure 132. The spring loaded mount adapter 150 includes a base component 180 that may have multiple openings 190a and 190b on the top of the base component 180 as well as a central raised member 130. The spring loaded mount adapter 150 may further include a first component 110a with a raised member 115a and an input mechanism 120a. The spring loaded mount adapter 150 may also include a second component 110b with a raised member 115b and an input mechanism 120b.

In various example embodiments, the camera 170 may be substantially enclosed by the camera frame 160. The camera 170 includes a camera body having a camera lens 185 structured on a front surface of the camera body. The camera 170 may include various other components, for example, a light emitting diode 175 on the front of the surface of the camera body. In one embodiment, the camera frame 160 may include one or more securing structures 132 for securing the camera frame 160 to one of a variety of mounting adapters. For example, FIG. 1 illustrates the camera frame 160 with multiple extensions 134a and 134b configured to couple with a raised member 115a of the first component 110a, a raised member 115b of the second component 110b, and the central raised member 130 of the base component 180. In various example embodiments, the multiple extensions 134 of the camera frame 160 may each have a hole. Therefore, when a detent of the raised member 115a of the first component 110a and a detent of the raised member 115b of the second component 110b is inserted through the hole, the spring loaded mount adapter 150 is coupled with the camera frame 160. Therefore, the position of the camera system 100 is fixed relative to the position of the spring loaded mount adapter 150. Further details regarding the coupling of the spring loaded mount adapter 150 and the camera system 100 is described below.

As depicted in FIG. 1, portions of the first component 110a and second component 110b are housed within the base component 180. In various embodiments, the raised member 115a of the first component 110a extends upward (e.g. vertically) from the base component 180 through a first opening 190a. Additionally, the first component 110a may have an input mechanism 120a at one end of the first component 110a that protrudes outward from the base component 180. Similarly, the raised member 115b of the second component 110b extends upward (e.g. vertically) from the base component 180 through a second opening 190b and may also have an input mechanism 120b that protrudes outward from the base component 180.

In various embodiments, the raised member 115a of the first component 110a, the raised member 115b of the second component 110b, and the central raised member 130 are parallel to one another. Together, they couple with the multiple extensions 134 on the camera frame 160 that may be configured to be similarly parallel. However, one skilled in the art may envision a variety of other configurations that may not require the raised members 115a, 115b, and 130 to be parallel to one another.

Components of the Spring Loaded Mount Adapter

Figure 2:
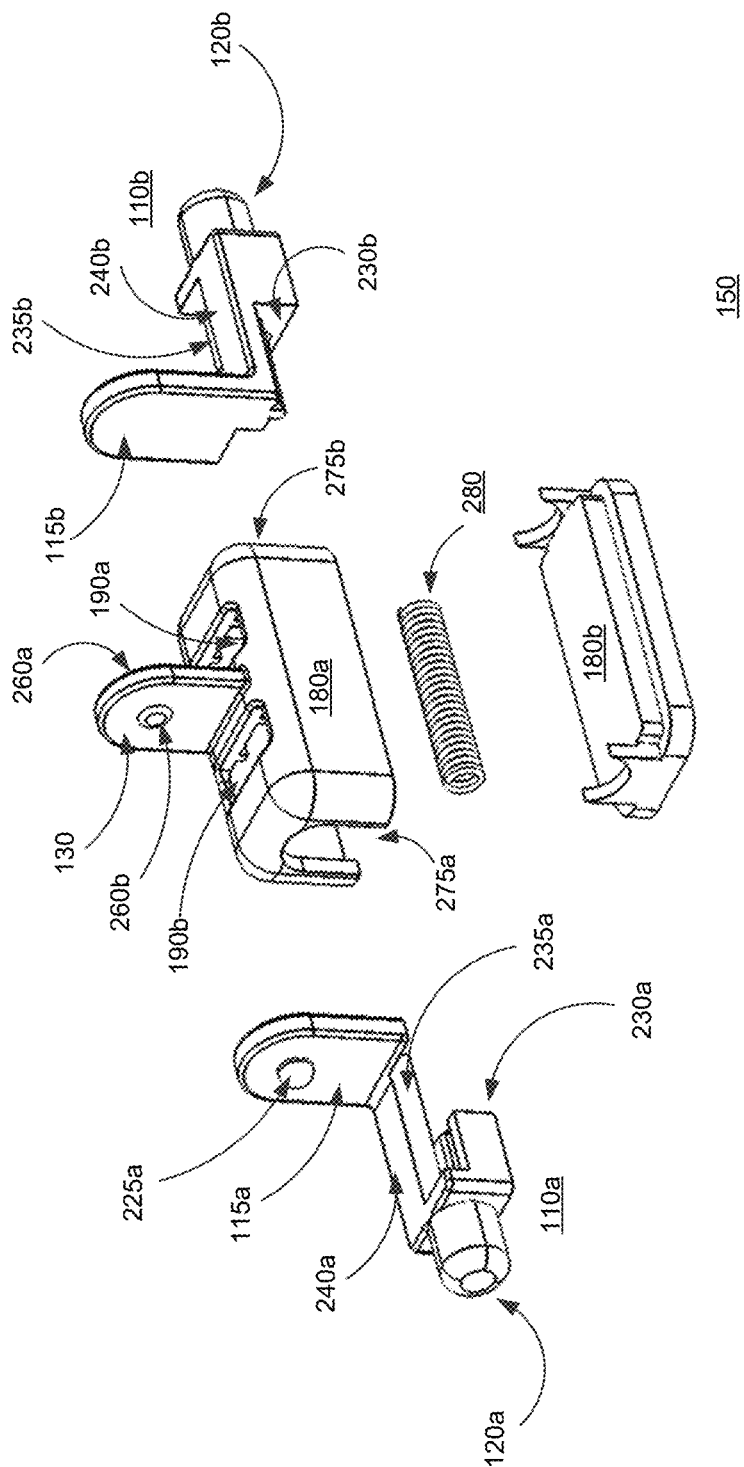
FIG. 2 illustrates an exploded view of the individual components in the spring loaded mount adapter, according to one example embodiment.

FIG. 2 illustrates the individual components of the spring loaded mount adapter 150, according to one example embodiment. As previously described, individual components of the spring loaded mount adapter 150 may include a first component 110a, a second component 110b, and a base component 180 that may further be divided into a top base component 180a and a bottom base component 180b. Additionally, the spring loaded mount adapter 150 may include a spring component 280.

The first component 110a and the second component 110b may be designed with similar features. As previously described, each component may have an input mechanism 120a and 120b and a raised member 115a and 115b. In various embodiments, each component may further include a detent 225a and 225b on the raised member 115a and 115b, a middle member 240a and 240b, a horizontal face 235a and 235b, and a bottom block 230a and 230b.

As previously described, the base component 180 may have multiple openings 190a and 190b and a central raised member 130. In various embodiments, the multiple openings 190a and 190b and the central raised member 130 may be included in the top base component 180. Additionally, the top base component 180a may include side openings 275a and 275b and protrusions 260a (not shown) and 260b located on the central raised member 130.

As depicted in FIG. 2, the raised member 115a of the first component 110a and the raised member 115b of the second component 110b each extend upward from the first component 110a and second component 110b. When the camera frame 160 is coupled to the spring loaded mount adapter 150 in a resting configuration, each raised member 115a and 115b may be responsible for preventing the extensions 134 of the camera frame 160 from displacing relative to the spring loaded mount adapter 150. For example, referring briefly to FIG. 1, each raised member 115a and 115b may be configured to sit in contact with a surface of an extension 134a or 134b. Therefore, in the resting configuration, the raised members 115a and 115b prevent the camera frame 160 from laterally displacing.

Referring to FIG. 2, in various embodiments, each raised member 115a and 115b includes detents 225a and 225b, respectively, that further prevent the camera frame 160 from vertically displacing. The detent 225a on the first component 110a is configured to enter into a hole on a first extension 134a of the camera frame and the detent 225b on the second component 110b is configured to enter into a hole on a second extension 134b of the camera frame.

In various embodiments, the detents 225a and 225b may be half spherical extensions extending from the first 115a and second raised members 115b, respectively. However, in other embodiments, the detents 225a, 225b may be cylindrical, block-shaped, or ramped provided that they couple with the extensions 134 of the camera frame 160. In an embodiment, the detent 225a, 225b may be a spring loaded ball system. For example, a ball in a spring loaded ball system may horizontally displace, e.g., increase by increasing spring compression, as the camera frame 160 is engaged with the spring loaded mount adapter 150. The spring compression may decrease to return to its original position as the ball enters into a hole located on an extension 134 of the camera frame 160.

In various embodiments, each raised member 115a and 115b may include further design configurations that prevent the camera frame 160 from displacing relative to the spring loaded mount adapter 150. As previously stated, each raised member 115a and 115b may include a face that is configured to sit in contact with a surface of an extension 134a and 134b of the camera frame. The face of each raised member 115a and 115b, which also includes the detent 225a and 225b, may include a surface composed of a substance that increases the coefficient of friction between the face of the raised member 115a and 115b and the extensions 134 of the camera frame 160. In various embodiments, the coefficient of friction is dependent on characteristics (e.g. spring constant) of the spring element 280 that forces the face of each raised member 115a and 115b to be in contact with the extensions 134 of the camera frame 160. Therefore, in order to vertically displace relative to the spring loaded mount adapter 150, the camera frame 160 must overcome the frictional forces derived from the increased coefficient of friction. For example, the substance on the surface of the face of each raised member 115a and 115b may be an elastomer or a different polymeric compound. The substance may be coated on the surface of each face of each raised member 115a and 115b or each face may be entirely composed of the substance.

The presence of a substance coated surface on the face of each raised member 115a and 115b also enables the camera frame 160 to be rotationally affixed in a particular position relative to the spring loaded mount adapter 150. As depicted in FIG. 1, the camera system 100 is oriented such that the camera's 170 line of sight is directed out of the page (e.g. 0 degrees relative to the horizon). In some scenarios, the camera frame 160 may be mounted with the spring loaded adapter 150 in a rotated position such that the camera's 170 line of sight is rotated relative to the horizon. More specifically, the camera frame 160 may be in a rotated resting configuration (e.g. rotated into the page or out of the page as shown in FIG. 1) such that the camera frame 160 is rotated around the coupling point between the extensions 134 and the detents 225a and 225b of the first 115a and second raised members 115b. In this rotated resting configuration, the increased coefficient of friction between the face of the raised member 115a and 115b and the extensions 134 of the camera frame 160 ensures that the camera frame 160 remains rotationally affixed relative to the spring loaded mount adapter 150. For example, if the camera 170 is capturing pictures or video with a line of sight of 30 degrees above the horizon, the frictional forces ensure that the camera's line of sight does not increase from 30 degrees above the horizon.

In other embodiments, the surface of each face of each raised member 115a and 115b and the extensions 134 of the camera frame 160 may each be designed such that their coupling occurs through a mechanical interface, such as, but not limited to, a Hirth joint. In other words, the surface of each face of each raised member 115a and 115b and the extensions 134 of the camera frame 160 may each have mechanical structures (e.g., tapered teeth in the case of a Hirth join) that, when interlocked, enable the camera frame 160 to be set at a particular rotated resting configuration. Thus, a user may set the rotational position of the camera frame 160 at pre-defined angles determined by the design of the mechanical interface in order to adjust the camera's line of sight.

In various embodiments, the first component 110a and the second component 110b each further comprise an input mechanism 120a and 120b located on a second end of each component. As illustrated in FIG. 2, each input mechanism 120a and 120b may be designed with a knob-like structure to facilitate the receival of a user input. The first component 110a and the second component 110b may include a middle member 240a and 240b which connects the input mechanism 120a and 120b to the raised member 220a and 220b, respectively. Therefore, when an input mechanism 120a and 120b displaces in response to a force input, the middle member 240a and 240b is configured to cause the respective raised member 115a and 115b to similarly displace. Additionally, the middle member 240a and 240b may include a horizontal face 235a and 235b, respectively. In various embodiments, when the spring loaded mount adapter 150 is fully assembled, the horizontal face 235a of the middle member 240a of the first component 110a may sit flush (or substantially flush, e.g., flush within an acceptable degree of mechanical tolerance) with the horizontal face 235b of the middle member 240b of the second component 110b. Referring to FIG. 1, the middle members 240a and 240b, horizontal faces 235a and 235b, and bottom blocks 230a and 230b of the first 110a and second 110b components as well as the spring component 280, may be housed within the assembled base component 180.

In various example embodiments, the first component 110a and the second component 110b may each further comprise a bottom block 230a and 230b. Each bottom block 230a and 230b may be movably coupled to a spring component 280. For example, the bottom block 230a of the first component 110a and the bottom block 230b of the second component 110b may each have a structure configured to receive the spring component 280 (not shown). In various embodiments, the structure is configured such that the diameter of the structure is smaller than the inner diameter of the spring component 280 such that the spring component 280 may couple with the structure when the spring loaded mount adapter 150 is assembled. In various embodiments, when coupled to the spring component 280, bottom blocks 230a and 230b may only allow the spring component 280 to deform along the length of the spring component 280 (e.g., in tension or compression) while restricting the spring component's movement in other directions.

Continuing with FIG. 2, reference is made to the base component 180 of the spring loaded mount adapter 150. The base component 180 may be further divided into a top base component 180a and bottom base component 180b for the purposes of assembling or disassembling the individual components of the spring loaded mount adapter 150. When fully assembled, the top base component 180a and the bottom base component 180b enclose the middle member 240a of the first component 110a, the middle member 240b of the second component 110b, and the spring component 280. The bottom base component 180b may have a flat bottom surface that is designed to sit in contact with a surface such that the fully assembled spring loaded mount adapter 150 is stably rests on a flat surface.

As previously described, the top base component 180a may have a central raised member 130. The central raised member 130 may vertically extend from the top base component 180a for the purposes of coupling with the camera frame 160. The central raised member 130 may have two faces. Each face may include a protrusion 260 (note, FIG. 2 only depicts a protrusion 260b on one face of the central raised member 130; however it would be clear to one skilled in the art that another protrusion 260a may be included on another face of the central raised member 130). Each protrusion 260a and 260b may be designed to substantially align and couple with a hole on an extension 134 of the camera frame 160. Therefore, when coupled to the camera frame 160, each protrusion prevents the camera frame 160 from vertically displacing.

One skilled in the art may appreciate that although FIG. 2 depicts a single central raised member 130, in various embodiments, there may be more than one central raised member 130 depending on the design of extensions 134 of the camera frame 120. For example, the camera frame 160 may have three extensions 134. Therefore, the top base component 180a may correspondingly have two central raised members 130 to couple with the three extensions 134 on the camera frame 160. Furthermore, the top base component 250a also may include side openings 275a and 275b that enable the input mechanisms 120a and 120b of the first 110a and second 110b components to protrude outward from the base component 180.

Referring back to FIG. 1 and more specifically to how the individual components of the spring loaded mounter adapter 150 interface with one another, the raised member 115a of the first component 110a, the raised member 115b of the second component 110b, and the central raised member 130 of the base component 180 each contribute towards ensuring that when in the resting configuration, the camera frame 160 is held from directionally or rotationally displacing relative to the spring loaded mount adapter 150. For example, the raised member 115a of the first component 110a may be configured to abut a surface of a first extension 134a and the raised member 115b of the second component 110b may be configured to abut a surface of a second extension 134b.

Additionally, the central raised member 130 of the top base component 180a may be configured to abut a different surface of the first extension 134a and a different surface of the second extension 134b of the camera frame 160. In this configuration, each detent 225a or 225b may extend from a face of the raised member 115a and 115b and faces towards the central raised member 130. The detent 225a of the first component 110a passes through a corresponding hole of the first extension 134a and the detent 225b of the second component 110b passes through a corresponding hole of the second extension 134b. To further stabilize the position of the camera frame 160, the protrusion 260a on the central raised member also enters into a hole of the first extension 134a and the protrusion 260b on the central raised member enters into a hole of the second extension 134b.

In various embodiments, instead of protrusions 260a and 260b, the central raised member 130 may include indentations that are configured to couple with each detent 225a and 225b on the first and second raised members 115a and 115b. For example, the detent 225a of the first component 110a may be configured to pass through a hole on the first extension 134a of the camera frame 160 such that the detent 225a can be received by the indentation 260a on the central raised member 130. Similarly, the detent 225b of the second component 110b may be configured to pass through a hole on the second extension 134b of the camera frame 160 such that the detent 225b can be received by the indentation 260b on the central raised member 130. Each detent 225a and 225b may be spherical in shape and may interface with the corresponding indentation that is concave in shape, such that the spherical surface of each detent 225a and 225b is in contact with the surface of the corresponding concave indentation when in the resting configuration. Therefore in this resting configuration, the camera system 100 is held from lateral or vertical displacement relative to the spring loaded mount adapter 150 due to the coupling between the detents 225a and 225b of the first 110a and second components 110b, the indentations 260a and 260b of the central raised member 130, and the extensions 134a and 134b of the camera frame 160.

Operation of the Spring Loaded Mount Adapter

Figure 3:
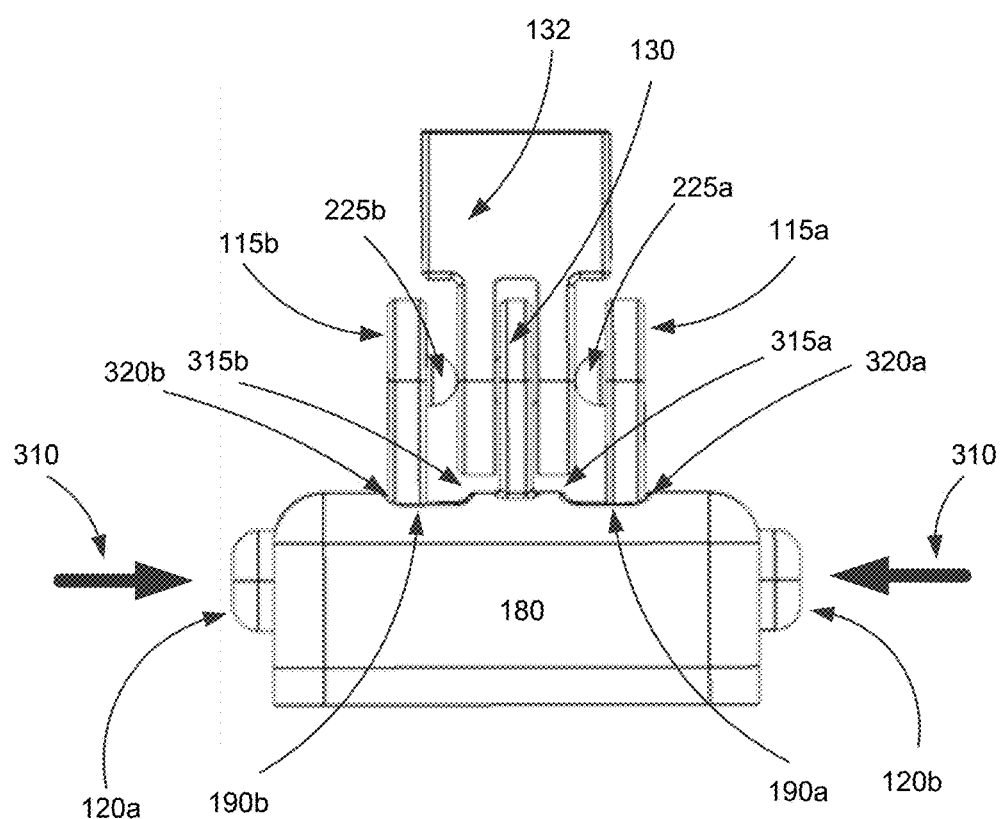
FIG. 3 illustrates the spring loaded mount adapter in an open configuration when receiving a force input, according to one example embodiment.

FIG. 3 illustrates the spring loaded mount adapter 150 in an open configuration, according to one example embodiment. FIG. 3 illustrates the application of a force input 310 on the input mechanisms 120a and 120b of the first and second components and the displacement of the raised members 115a and 115b from a first edge 315a and 315b to a second edge 320a and 320b. Further reference will also be made in regards to FIG. 4 that depicts the assembled components of the spring loaded mount adapter 150 that are housed within the base component 180, according to one example embodiment.

The input mechanisms 120a and 120b of the first 110a and second 110b component may be configured to receive a force input from a user. For example, a user may readily access both input mechanisms 120a and 120b given that they protrude from the base component 180. Upon receiving a directional force input 310 against the input mechanisms 120a and 120b, the input mechanisms 120a and 120b may displace inwardly towards each other. Given that the first 110a and second 110b components may be movable along the base component 180, the displacement of the input mechanisms 120a and 120b may be translated to the raised members 115a and 115b and similarly causes them to move away from the central raised member 130 and each other. In particular the raised members 115a, 115b move in a direction opposite to the illustrated applied force 310. Accordingly, spring loaded mount adapter 150, as shown in FIG. 3, may be considered in an open configuration.

The difference in the configuration of the spring loaded mount adapter 150 as depicted in FIG. 1 (resting configuration) and FIG. 3 (open configuration) may be visualized. For example, a reduced portion of the input mechanisms 120a and 120b protrude from the base component 180 in the open configuration. Additionally, the first raised member 115a and second raised member 115b may be movably displaced away from one another in the open configuration. In various embodiments, the raised member 115a of the first component may be in contact with a first edge 315a of the opening 190a when in the resting configuration. Similarly, the raised member 115b of the second component may be in contact with a first edge 315b of the opening 190b when in the resting configuration. In the open configuration, the raised member 115a of the first component may be displaced by a maximum distance that may be set by the location of a second edge 320a of the opening 190a. Similarly, the raised member 115b of the second component may be displaced by a maximum distance that may be set by the location of a second edge 320b of the opening 190b. The maximum distance is set by the width of the opening 190a and 190b and may ensure that the raised members 115a and 115b undergo enough displacement such that the detents 225a and 225b may be decoupled from their respective holes on their respective extensions 134 of the securing structure 132. Therefore, in the open configuration, the camera frame 160 may be removed from the spring loaded mount adapter 150.

Figure 4:
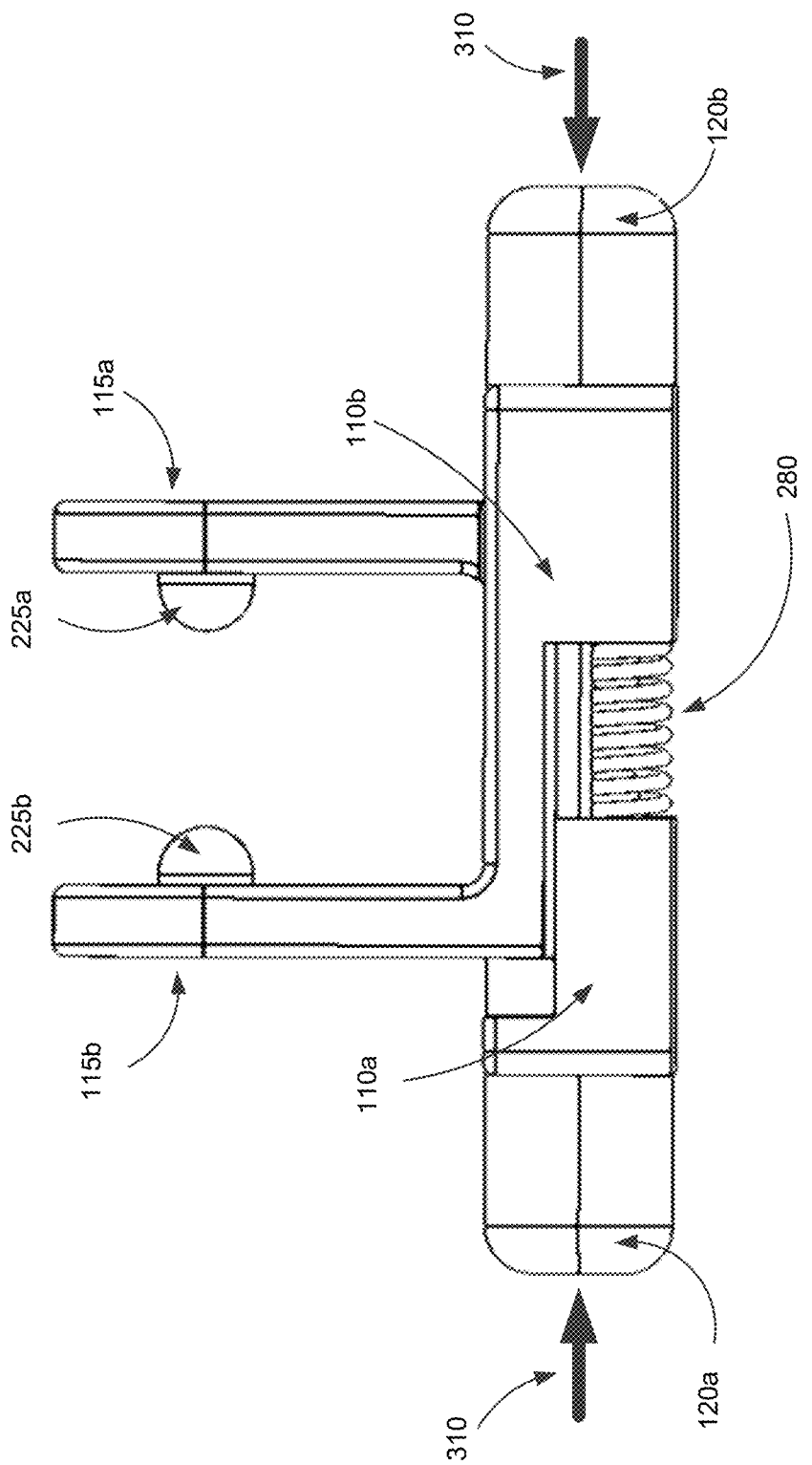
FIG. 4 depicts the assembled components of the spring loaded mount adapter that are housed within the base component, according to one example embodiment.

Referring to FIG. 4, when in a resting configuration, the spring component 280 may be at rest (e.g. neither in compression nor in tension). Therefore, the length of the spring component 280 at rest determines the position of the first 110a and second 110b components. If a force input 310 is provided on the input mechanisms 120a and 120b in an attempt to release the camera system, the spring component 280 compresses and the first 115a and second raised members 115b may movably displace away from one another in a direction of opposite of the respective applied force 310. Similarly, the detents 225a and 225b of the raised members 115a and 115b also displace to decouple from the extensions of the camera frame. Upon cessation of the applied force input on the input mechanisms 120a and 120b, the spring component 280 may revert back to its resting length. This may cause the first 115a and second raised members 115b to movably displace towards one another back to the resting configuration.

Additional Configuration Considerations

The disclosed embodiments of the spring loaded mount adapter provide advantages over conventional camera mount adapters. The spring loaded mount adapter is configured to enable a user to rapidly couple a camera to the spring mount adapter. Once coupled, the spring mount adapter effectively stabilizes the position of the camera by ensuring that the camera is unable to directionally or rotationally displace relative to the spring mount adapter. Additionally, a user of the spring loaded mount adapter can rapidly decouple the camera from the spring loaded mount adapter by providing a compressive user input. This enables the user to easily gain access to the camera without the spring loaded mount adapter if he/she desires.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for smart frames as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A spring loaded mount adapter comprising:
    a base component having a central raised member;
    a first component movably coupled within the base component and having a first raised member with a detent facing toward the central raised member; and
    a second component movably coupled within the base component and having a second raised member with a detent facing towards the central raised member,
    the first component and the second component coupled together through a single spring component, the first component movable along the base component to move the first raised member away from the central raised member, and
    the second component movable along the base component to move the second raised member away from the central raised member.

2. The spring loaded mount adapter of claim 1, wherein the detent of the first component is configured to couple with a hole in a first extension of a camera frame and the detent of the second component is configured to couple with a hole in a second extension of the camera frame.

3. The spring loaded mount adapter of claim 1, wherein the first component further comprises a first input mechanism and wherein the second component further comprises a second input mechanism, the first and second input mechanisms each designed to receive a user force input.

4. The spring loaded mount adapter of claim 3, wherein the first input mechanism protrudes from a first port in the base component and the second input mechanism protrudes from a second port in the base component.

5. The spring loaded mount adapter of claim 3, wherein the first and second raised members of the first and second components move away from the central raised member in response to the received user force input to the first and second input mechanisms.

6. The spring loaded mount adapter of claim 3, wherein the first and second raised members of the first and second components are each able to move away from the central raised member to a maximum distance in response to the received user force input to the first and second input mechanisms.

7. The spring loaded mount adapter of claim 6, wherein upon cessation of the applied force input, the first and second raised members of the first and second components return to a resting configuration.

8. The spring loaded mount adapter of claim 7, wherein the resting configuration is determined in part by the length of the single spring component at rest.

9. The spring loaded mount adapter of claim 1, wherein the central raised member further comprises a first and second protrusion, the first protrusion designed to couple with a hole in a first extension of a camera frame and the second protrusion designed to couple with a hole in a second extension of the camera frame.

10. The spring loaded mount adapter of claim 1, wherein the first raised member vertically protrudes from a first opening on the base component and the second raised member vertically protrudes from a second opening on the base component.

11. The spring loaded mount adapter of claim 10, wherein the first raised member, the second member, and the central raised member are parallel to one another.

12. A spring loaded mount adapter comprising:
    a base component having a central raised member; and
    a component movably coupled to a spring component within the base component and having a raised member with a detent facing towards the central raised member, wherein the raised member vertically protrudes from an opening of the base component,
    the component movable along the base component to move the raised member away from the central raised member.

13. The spring loaded mount adapter of claim 12, wherein the detent is configured to couple with a hole in an extension of a camera frame.

14. The spring loaded mount adapter of claim 12, wherein the component further comprises an input mechanism designed to receive a user force input.

15. The spring loaded mount adapter of claim 14, wherein the input mechanism protrudes from a side opening in the base component.

16. The spring loaded mount adapter of claim 15, wherein the raised member of the component moves away from the central raised member in response to the received user force input to the input mechanism.

17. The spring loaded mount adapter of claim 16, wherein upon cessation of the received user force input, the raised member of the component returns to a resting configuration.

18. The spring loaded mount adapter of claim 17, wherein the resting configuration is determined in part by the length of the spring component at rest.

19. The spring loaded mount adapter of claim 12, wherein the central raised member further comprises a protrusion, the protrusion designed to couple with a hole in an extension of a camera frame.

20. The spring loaded mount adapter of claim 12, wherein the raised member of the component and the central raised member are parallel to one another.

\* \* \* \* \*